US010976407B2

(12) United States Patent
Perez-Ramirez et al.

(10) Patent No.: US 10,976,407 B2
(45) Date of Patent: Apr. 13, 2021

(54) LOCATING RADIO TRANSMISSION SOURCE BY SCENE RECONSTRUCTION

(71) Applicant: Intel Corporation, Santa Clara, CA (US)

(72) Inventors: Javier Perez-Ramirez, North Plains, OR (US); David Israel Gonzalez Aguirre, Portland, OR (US); Javier Felip Leon, Hillsboro, OR (US); Mikhail T. Galeev, Portland, OR (US); Dave A. Cavalcanti, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/586,560

(22) Filed: Sep. 27, 2019

(65) Prior Publication Data

US 2020/0018814 A1    Jan. 16, 2020

(51) Int. Cl.
*H04B 17/318* (2015.01)
*G01S 5/02* (2010.01)
*G06T 15/06* (2011.01)

(52) U.S. Cl.
CPC .......... *G01S 5/0257* (2013.01); *G01S 5/0273* (2013.01); *G06T 15/06* (2013.01); *H04B 17/318* (2015.01)

(58) Field of Classification Search
CPC combination set(s) only.
See application file for complete search history.

(56) References Cited

U.S. PATENT DOCUMENTS

| 2011/0287778 A1* | 11/2011 | Levin | H04W 64/006 |
| | | | 455/456.1 |
| 2012/0320787 A1* | 12/2012 | Sugar | G01S 5/021 |
| | | | 370/252 |
| 2013/0023285 A1* | 1/2013 | Markhovsky | G01S 5/0215 |
| | | | 455/456.1 |

(Continued)

OTHER PUBLICATIONS

Gaber, A, "A study of wireless indoor positioning based on joint TDOA and DOA estimation using 2-D matrix pencil algorithms and IEEE 802.11ac", IEEE Trans on Wireless Communications May 2015, 14 (5), (May 2015), 2440-2454.

(Continued)

*Primary Examiner* — Ankur Jain
(74) *Attorney, Agent, or Firm* — Schwegman Lundberg & Woessner, P.A.

(57) ABSTRACT

Systems and techniques for locating a radio transmission source by scene reconstruction are described herein. A multipath radio signal—comprised of two or more multipath components—may be received at an antenna array. A collection of angle-of-arrival (AoA) values may be created from the multipath components. Thus, each AoA in the collection corresponds to one of the multipath components. An optical image of the environment may be obtained and possible reflective surfaces for the multipath components identified in the optical image. A set of paths may be created in a model of the environment by backtracking from the antenna array along the AoAs in the collection of AoA values. Here, the backtracking simulates reflections of the ray off of the surfaces identified in the optical image. A transmitter of the multipath radio signal may then be located via the set of paths.

21 Claims, 8 Drawing Sheets

(56) References Cited

U.S. PATENT DOCUMENTS

| | | | | |
|---|---|---|---|---|
| 2014/0171107 A1* | 6/2014 | Kao | .................... | G01C 21/206 |
| | | | | 455/456.1 |
| 2015/0234033 A1* | 8/2015 | Jamieson | .................. | G01S 5/04 |
| | | | | 455/456.1 |
| 2017/0299691 A1* | 10/2017 | Kumar | .................. | G01S 5/0215 |
| 2019/0037350 A1* | 1/2019 | Prevatt | .................. | H04W 4/023 |
| 2020/0025911 A1* | 1/2020 | Rappaport | .............. | G01S 13/42 |

OTHER PUBLICATIONS

Kotaru, Manikanta, "SpotFi: Decimeter Level Localization Using WiFi", SIGCOMM Comput. Commun. Rev. 45, 4, (Aug. 2015), 269-282.

Marchand, E, "A 2D-3D model-based approach to real-time visual tracking", Image and Vision Computing, 19(13), (2001), 941-955.

Quimby, J, "NIST Channel Sounder Overview and Channel Measurements in Manufacturing Facilities", NIST Pubs, (2017), 83 pgs.

Soltanaghaei, Elahe, "Multipath Triangulation: Decimeter-level WiFi Localization and Orientation with a Single Unaided Receiver", In Proceedings of the 16th Annual International Conference on Mobile Systems, Applications, and Services (MobiSys '18). ACM, New York, NY, USA, (2018), 376-388.

Triggs, B, "Bundle adjustment—a modem synthesis", In International workshop on vision algorithms Springer, Berlin, Heidelberg, (Sep. 1999), pp. 298-372.

Whelan, T, "ElasticFusion: Real-time dense SLAM and light source estimation", The International Journal of Robotics Research, 35(14), (2016), 1697-1716.

* cited by examiner

FIG. 8

LOCATING RADIO TRANSMISSION SOURCE BY SCENE RECONSTRUCTION

TECHNICAL FIELD

Embodiments described herein generally relate to object localization and more specifically to locating a radio transmission source.

BACKGROUND

The topic of indoor positioning using radios has been explored in both the academia and the industry. For example, in wireless local area networks (WLAN), such as IEEE 802.11 compliant networks, different location estimation approaches have been proposed. Many techniques are based on fingerprinting, received signal strength indicator (RSSI), estimated angle of arrival (AoA), or Time of Flight (ToF) of radio signals from transmitter to receiver. Fingerprint based approaches often involve an offline measurement campaign, where RSSIs between a station (STA) and multiple access points (APs) are recorded in the form of a vector and associated to the STA location. Location estimation is often performed by matching the STA RSSI measurements with all recorded RSSIs vectors and finding the location with the best match. In RSSI based approaches, RSSI measurements between a STA and multiple APs are obtained by the STA. Distance between a STA and multiple APs is estimated using a propagation model and STA location is estimated using triangulation techniques. In AoA approaches, multiple multiple-input-multiple-output (MIMO) APs estimate the AoA of the line of sight (LOS) components of a STA transmission. Different AoA estimates from multiple APs are combined to perform localization. Additionally, in ToF based approaches, ToF information reported by WLAN cards is used to estimate distance between a STA and multiple APs. Once distance is estimated, triangulation techniques may be used to perform localization.

Indoor position may also be accomplished using visual techniques, such as scene reconstruction. Creating a scene-model based on visual sensors may be divided in two categories: passive sensing or active sensing. Active sensing generally uses light projected into the scene to obtain temporal coding or geometric structural elements in the scene. This may enable depth estimation, which may lead to computing the whole scene's Euclidean metric via structured point clouds, for example. There are many principles, variations, and products based on active vision, most of them rely on image projection by enriching the scene with arbitrary random texture facilitating triangulation of points via two-dimensional (2D) image feature correlation or by casting structured mosaics to infer surface-shape via pattern deformation. Active methods are useful but are often restricted to a limited sensing range and restricted to indoor environments.

Passive sensing generally involves capturing images and processing them to obtain three-dimensional (3D) scene models without altering the environment in any manner (e.g., without projecting a pattern into the environment). Thus, these techniques are often able to operate at larger ranges than active techniques as wells as in outdoor environments. However, passive sensing generally depends on the appearance (e.g., texture, color, border, etc.) of the scene to estimate the 3D structure by, for example, a mathematical mean (e.g., average) of point-to-point triangulation between views obtained either by a single moving camera (e.g., structure-from-motion) or from multiple inter-calibrated cameras (e.g., stereoscopic vision, trifocal system, etc.). Passive scene reconstruction may be difficult when, for example, point clouds are sparse, which is typical, leading to difficulty in distinguishing 3D surfaces from the point clouds. This scenario may be common because there are many surfaces in common scenarios lacking texture or distinctive appearance features. This makes it difficult to obtain reliable 3D information from monotone homogeneous surfaces such as light walls, darks textiles, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Radio-based positioning techniques often involve using more than one AP to perform localization. In addition, many of these techniques require a LOS radio signal in at least one of the distance measurements to provide accurate results. To overcome these issues, High-accuracy indoor positioning of WLAN client (or other radio technology) devices in challenging environments filled with multipath components may be achieved with a single AP by combining radio transmission data with knowledge of the environment via visual scene reconstruction using cameras at the AP. Specifically, the visual scene reconstruction enables reflective surfaces to be identified with respect to the AP. Estimated AoA of multipath radio components from the transmitter (e.g., object being located) may be used to backtrack the multipath component to a reflective surface, simulate reflection of the multipath component, and arrive at paths of the multipath components throughout the scene. These paths may then be used to triangulate the transmitter. In this manner, a single AP may accurately identify the transmitter even when no LOS multipath component is available. Additional detail and examples are provided below.

Figure 1:
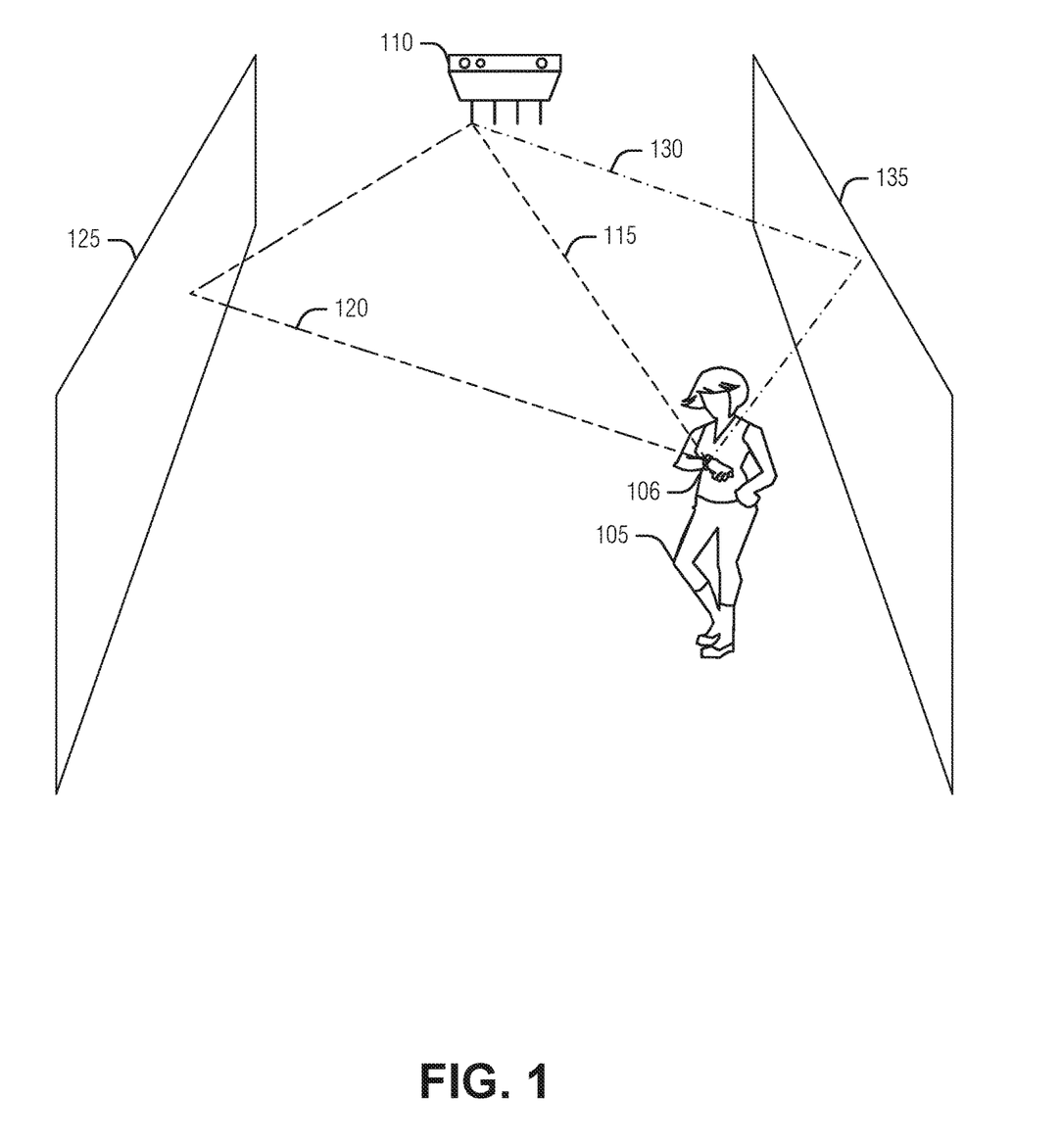
FIG. 1 illustrates an example of an environment including a system to locating a radio transmission source by scene reconstruction, according to an embodiment.

FIG. 1 illustrates an example of an environment including a system to locate a radio transmission source by scene reconstruction, according to an embodiment. The illustrated environment includes a transmitter 106 worn by a user 105 that transmits a multipath radio signal comprising the paths 115, 120, and 130. The multipath component 120 is illustrated as reflecting off of the surface 125 before arriving at an antenna array in an AP 110, and the multipath component 130 reflects off of the surface 135 before arriving at the antenna array.

The illustrated AP 110 includes a camera in addition to the antenna array. In an example, the camera is a visible light color camera. Often such a camera is also sensitive in the infrared spectrum. In an example, the camera is a depth camera. In an example, the camera is both a visible light camera as well as a depth camera.

The AP 110 includes processing circuitry that may be hardwired or configured via the execution of software to receive the multipath radio signal at the antenna array. In an example, the multipath radio signal corresponds to transmission of a packet from the transmitter 106. In an example, the packet conforms to an IEEE 802.11 family of standards. Thus, here, the transmitter 106 is implementing a WLAN communication protocol. In an example, the transmitter 106 may be any device—such as a smart watch, mobile phone, beacon, etc.—capable of emitting a signal receivable by the AP 110.

The processing circuitry of the AP 110 is configured to create a collection of AoA values that respectively correspond the multipath components 115, 120, and 130. In an example, the AoA values are generated from a radio metric of a physical access layer, such as from channel state information (CSI) or the like. Although there are many techniques to generate AoA values for the multipath components, generally the known position of antenna in the antenna array is combined with the differential receipt of the same multipath component at the various antennas to provide the AoA.

The processing circuitry of the AP 110 is configured to obtain an optical image of an environment. In an example, the optical image is obtained from a camera housed in the AP 110. In an example, the camera is housed separately from the AP 110 (e.g., a remote camera). In an example, an alignment procedure, which may be implemented by the AP 110, is executed to align a field of view (FoV) of the camera with respect to AoAs received at the antenna array. In an example, the alignment includes positioning the camera and the antenna within a 3D environment (e.g., five feet above a floor in a north-east corner of a room). In an example, the alignment includes using multiple cameras at different locations in the environment, the multiple cameras having an overlapping FoV. This is discussed in greater detail below but involves using known positions of the cameras to ascertain the position (e.g., x, y, z coordinates) and the orientation (e.g., pitch, yaw, roll) of the cameras with respect to each other.

The processing circuitry of the AP 110 is configured to create a set of paths in a model of the environment by backtracking from the antenna array along the AoAs in the collection of AoA values including reflections off of surfaces identified in the optical image. Here, the optical image is used to identify potential surfaces. Starting with the antenna array, a ray is traced in a 180-degree direction from an AoA until the ray encounters a surface. The ray is then reflected and progresses until it finds another surface. In an example, a 3D model of the environment, for example constructed previously or with the assistance of cameras at other positions in the environment, may provide additional reflective surfaces that are not visible to the AP 110. In an example, creating the set of paths in the model includes performing raytracing with a first order reflection model. Such a model is described below. It generally helps to constrain which of the possible reflective surfaces 125 and 135 are actually reflecting the multipath component 120.

In an example, the processing circuitry of the AP 110 is configured to create a time-of-flight (ToF) collection for the multipath components. In an example, a multipath component is designated a reference multipath component (RMC) in response to a corresponding ToF being equal to a lowest ToF in the ToF collection. In an example, the RMC has no reflections (e.g., is a line-of-sight component, such as multipath component 115).

Once the paths are created in the model environment, triangulation may be used by the processing circuitry of the AP 110 to estimate the location of the transmitter 106. In an example, locating the transmitter 106 via the set of paths includes using the set of paths to triangulate the transmitter 106.

Figure 2:
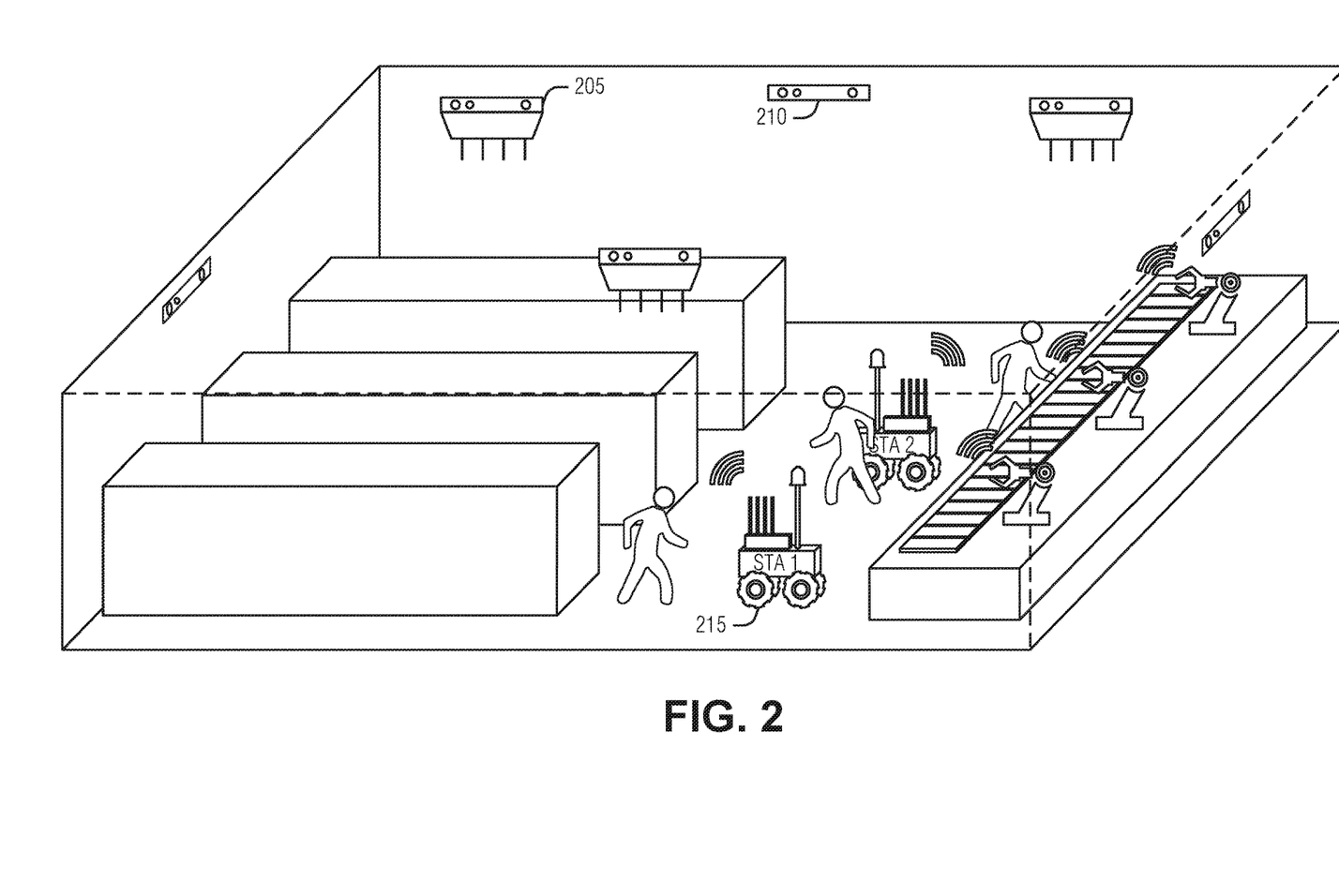
FIG. 2 is an example of an indoor positioning system using wireless local area network (WLAN) signal and a camera to implement visual scene reconstruction, according to an embodiment.

FIG. 2 is an example of an indoor positioning system using WLAN signals and a camera to implement visual scene reconstruction, according to an embodiment. As illustrated, the AP 205 includes a multi-antenna array to discern multipath components of a signal from, for example, the station 215. The AP 205 also includes a camera array 210 used to identify reflective surfaces in the scene. The camera array 210 may be used to support the scene modeling of the AP 205. The camera array 210 may be a color camera (RGB) and may also be a depth camera (RGB-D).

In the illustrated scenario, it may be assumed that each AP has multiple antennas; the locations of the APs are known; the APs are synchronized and connected to a central controller, e.g., where position estimation of STAs is performed; and a set of six dimensional (6D) (e.g., x, y and z coordinates and pitch, roll, and yaw angles for orientation) values for registered cameras deployed in the environment.

Although a single AP-camera system may be used, here multiple APs and cameras are combined. When using a single AP-camera, prior knowledge of the environment may be necessary. For instance, a computer aided design (CAD) model of the environment may be used. This prior knowledge may be used for a faster or more reliable calibration of the camera or establishing its 6D pose in the environment via Bundle Adjustment and Model Based localization methods, for example. When multiple cameras with overlapping field of views (FoVs) are used, no prior knowledge of the environment is needed because cameras may build a real time 3D representation of the environment.

3D maps of the environment may be used in conjunction with data extracted from WLAN signals to perform positioning. For example, the AP 205 may receive a data packet from the STA 215 and extract the channel state information (CSI) from the data packet. Using the Joint AoA and Delay estimation (JADE) algorithm, the AoA and ToF of received multipath components may be estimated. The AoA corresponding to the multipath component with the lowest ToF may be identified and labeled as the reference multipath component (RMC). The lowest ToF corresponds to the most direct path between the STA 215 and the AP 205.

A list of AoAs corresponding to each multipath component may be sent to the visual scene-reconstruction system, whether in the AP 205 itself, or at a remote machine (not pictured). The visual scene-reconstruction system may identify potential reflectors by ray-tracing each AoA and computing the intersection point in the synchronized depth image of the environment from the AP's perspective. Because the camera system generally has a component that operates in the visible spectrum, non-reflective objects may be considered reflectors. Moreover, if previous knowledge in the form of a CAD model of the environment or a previous reconstruction is available it may be used to consider multiple reflectors (e.g., surfaces not visible to the AP 205.

An unconstrained multipath triangulation problem considering AoA and reflector candidates of all multipath components may be used to locate the STA 215. For example, a first order reflection model may be used to model the multipath signal. In this model, only the RMC is allowed to be LOS or without reflections. Estimated ToFs are used to constrain the problem and select correct reflector locations to estimate the location of STA 215.

Figure 3:
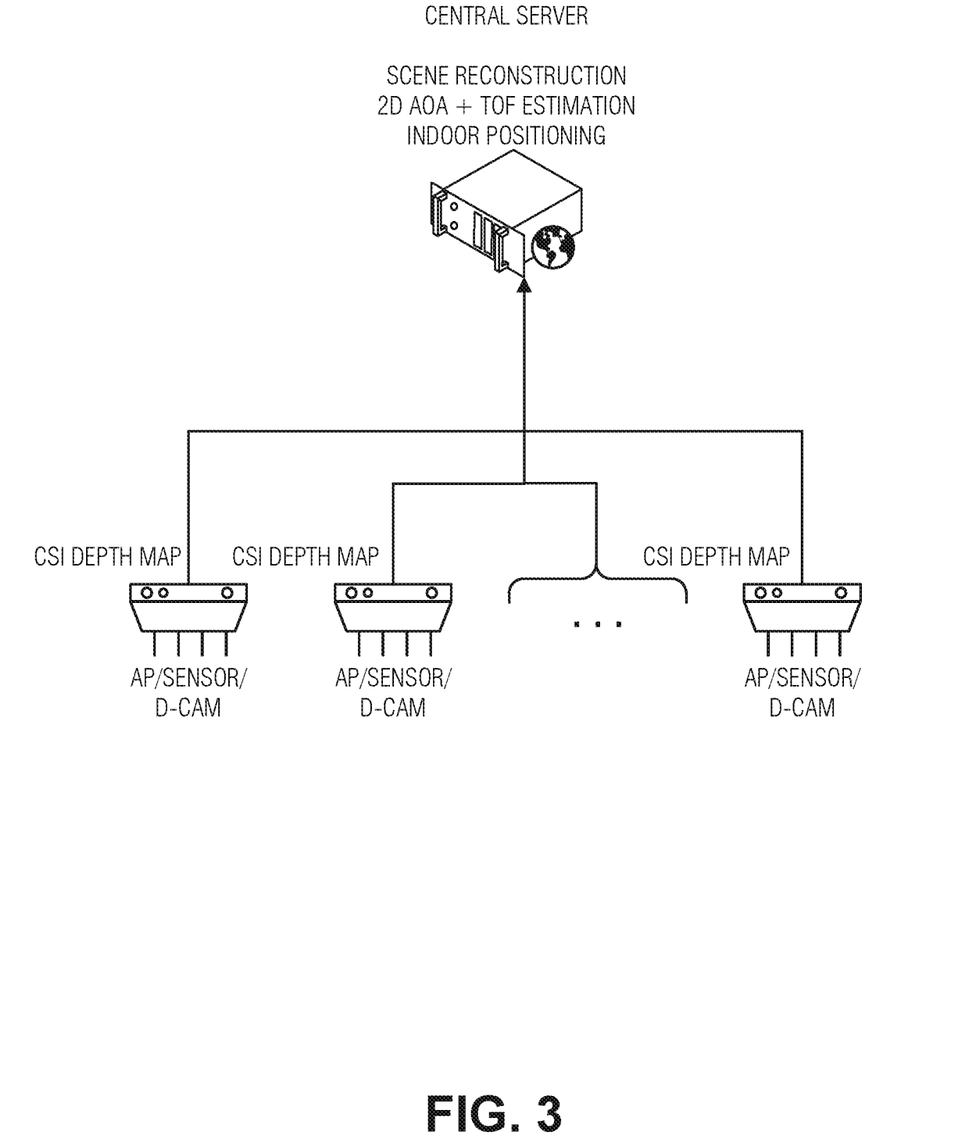
FIG. 3 is an architecture diagram of an access point (AP) and camera sensing system for location estimation, according to an embodiment.

FIG. 3 is an architecture diagram of an AP and camera sensing system for location estimation, according to an embodiment. Here, a single AP or multiple APs and depth sensing cameras are connected to a central server. The central server estimates the AoA ToF using CSI from the APs and computes the scene reconstruction using depth maps from depth sensing cameras (D-CAMs).

Figure 4:
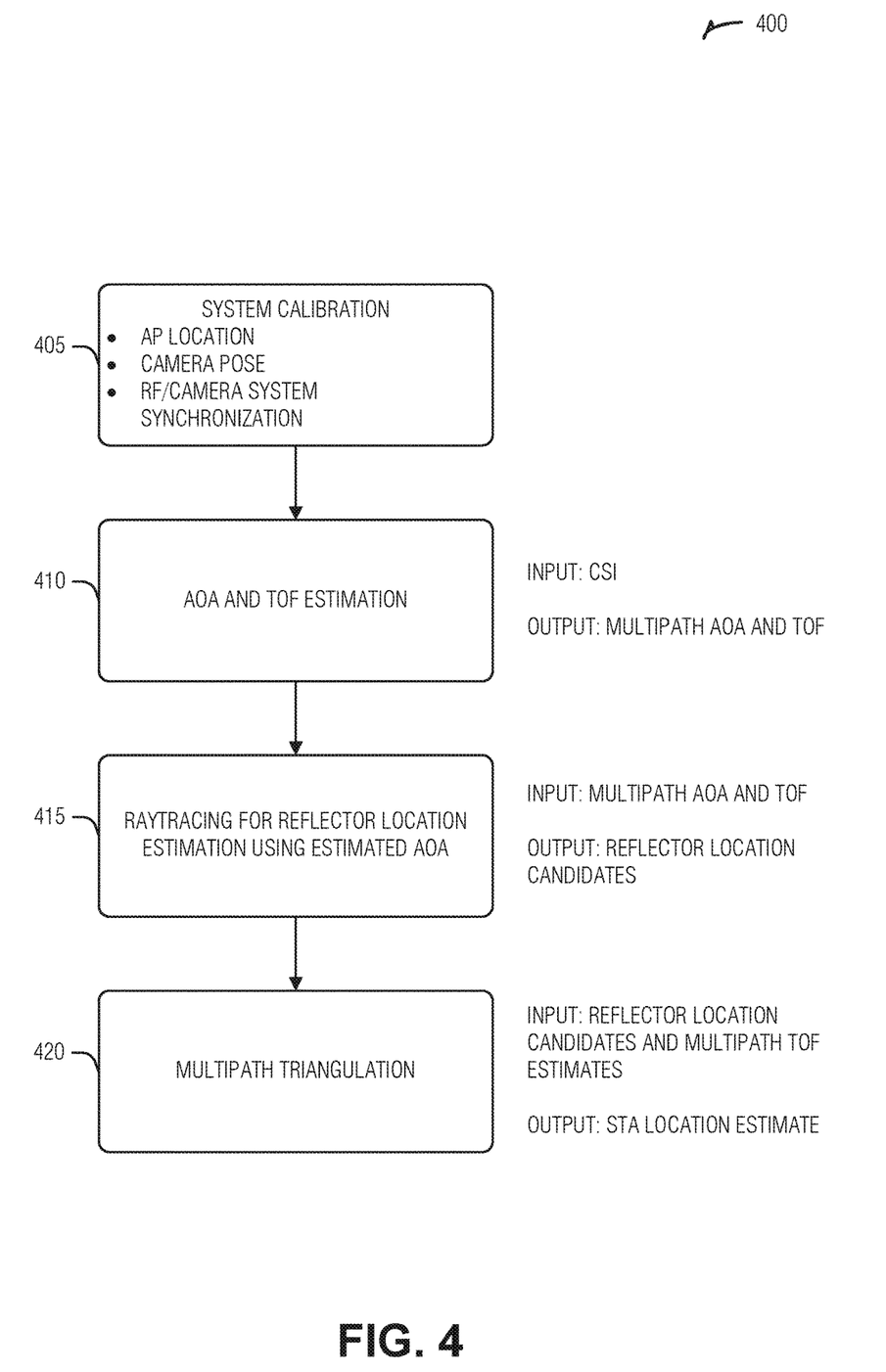
FIG. 4 is a flowchart of a multipath triangulation technique using scene reconstruction, according to an embodiment.

FIG. 4 is a flowchart of a multipath triangulation technique 400 using scene reconstruction, according to an embodiment. Although this example addresses 2D location estimation for clarity of description, it may also be extended to 3D location estimation. The system is calibrated (operation 405) to coordinate the camera FoV to the AoA estimates for the AP antenna. The synchronization may also position the AP within the environment, such that estimates of the STA position relative to the AP may be translated into position within the scene.

STA signals may be received and AoA and ToF estimations made from these signals (operation 410). The raytracing may be used to recreate the multipath component paths from the estimated AoAs (operation 415). Part of this operation 415 involves identifying possible reflector along the paths from the visual data gathered from the camera, depth camera, or environmental model (e.g., CAD representation of the environment). Once the correct reflectors are selected, the paths may be triangulated in order to estimate the STA's position (operation 420).

The following is an example technique to estimate the transmitter's position. Let M be the total number of detected multipath components and $r_k$, k=1, ..., M, be the total number of estimated reflectors per detected multipath component. Here, $r_1$ corresponds to the total number of reflectors of the RMC. Let $(x_{i,j}^n, y_{i,j}^n)$, n=2, ..., M, i=1, ..., $r_1$, j=1, ..., $r_n$, be the coordinates of the intersection between the h estimated reflector trajectory corresponding to the RMC, and the j-th reflector trajectory corresponding to the n-th multipath component. The pair $(d_{i,j}^{RMC}, d_{i,j}^n)$ is defined as the total path length of the RMC and n-th multipath component respectively associated with the intersection point $(x_{i,j}^n, y_{i,j}^n)$. Also, a cost function, defined as $S(n) = [\Delta T_n \times C - (d_{i,j}^n - d_{i,j}^{RMC})]^2$ where $\Delta T_n$ is the estimated time differnee of flight (ToF of n-th multipath component minus ToF of RMC) and C is the speed of light. For each value of n, n=2, ..., M, find the reflector that minimizes S(n). Consider $\hat{q} = [q_2, q_2, ..., q_M]$ to be a vector containing the reflector indices that minimize the cost function (1) for each detected multipath component. Then, the STA location estimation is given by $$(\hat{x}_{STA}, \hat{y}_{STA}) = \frac{1}{M-1}\left(\sum_{n=2}^{M}(x_{q_1,q_n}^n), \sum_{n=2}^{M}(y_{q_1,q_n}^n)\right).$$

Figure 5:
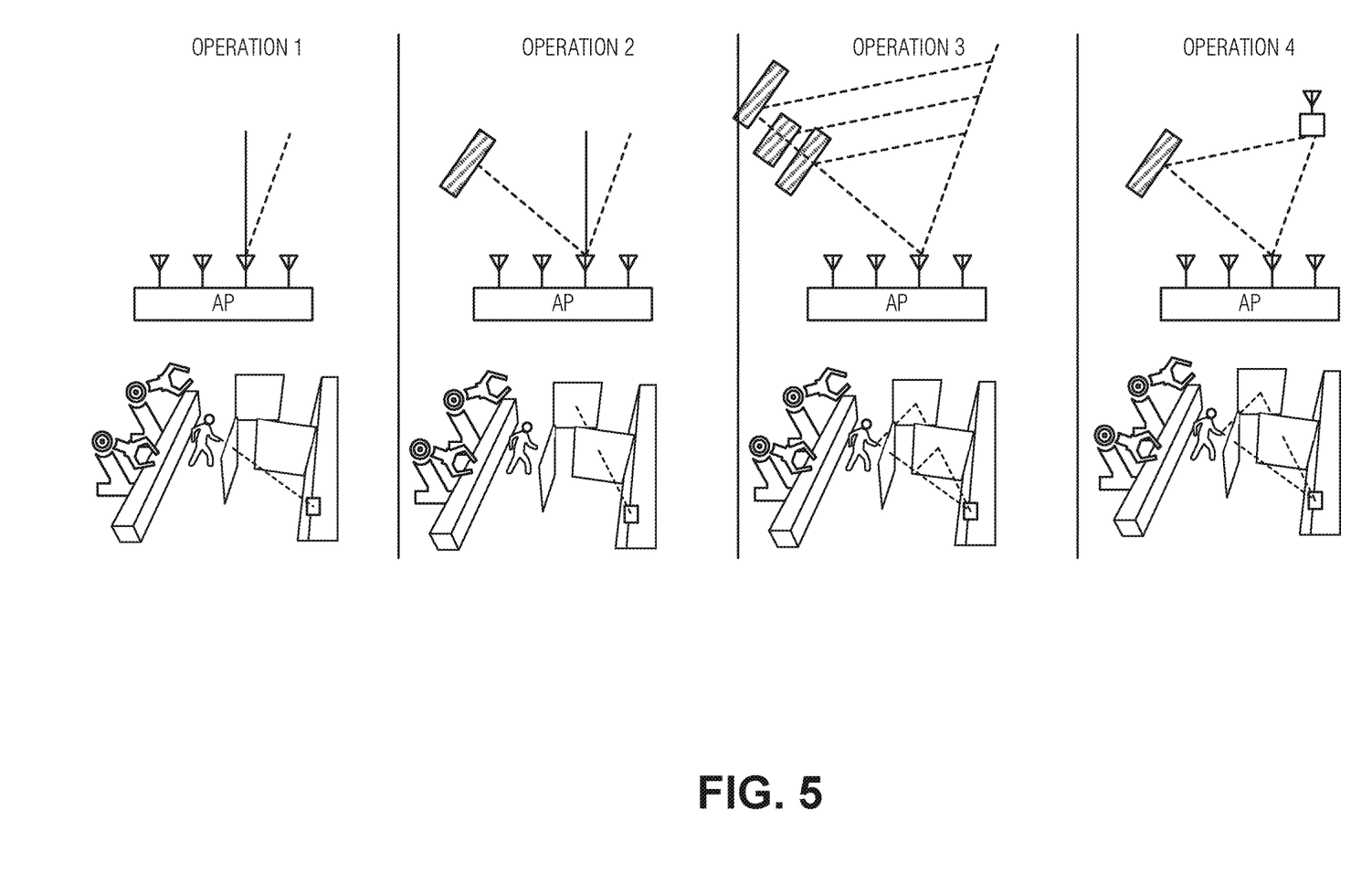
FIG. 5 illustrates an example of multipath triangulation using WLAN signals and three-dimensional (3D) maps generated by depth sensing cameras with a line-of-sight (LOS) reference multipath component (RMC), according to an embodiment.
Figure 6:
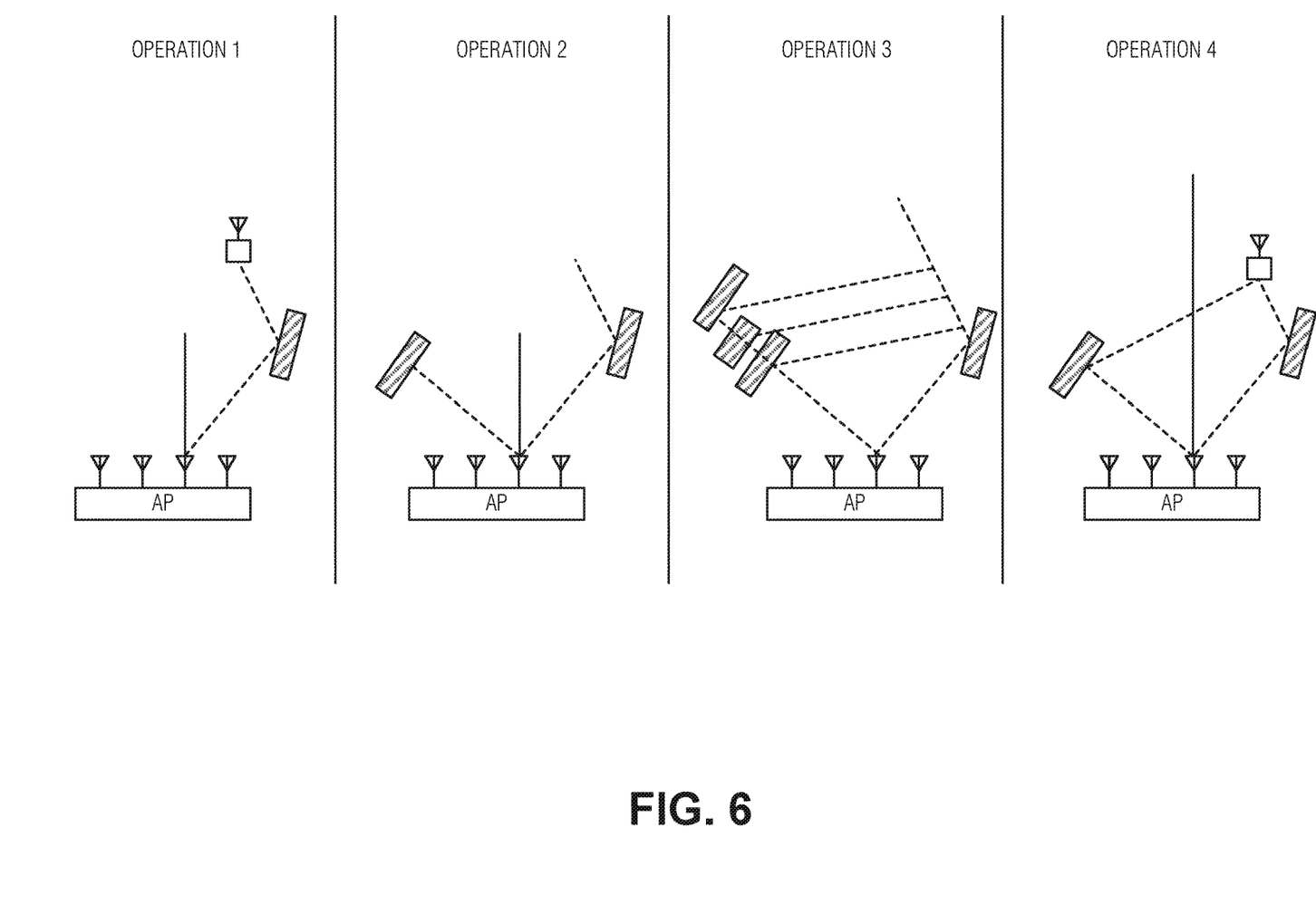
FIG. 6 illustrates an example of multipath triangulation using WLAN signals and three-dimensional (3D) maps generated by depth sensing cameras with no LOS RMC, according to an embodiment.

FIGS. 5 and 6 below illustrate an example of STA location estimation when the RMC is under LOS and NLOS conditions respectively. Only two paths are considered in the example for the sake of simplicity. As it may be observed, information exchanged between the AP (e.g., estimated multipath AoA) and the visual scene-reconstruction system is integrated to estimate the location of the STA.

FIG. 5 illustrates an example of multipath triangulation using WLAN signals and three-dimensional (3D) maps generated by depth sensing cameras with a line-of-sight (LOS) reference multipath component (RMC), according to an embodiment. Note that the wall between the person and the AP (box in the lower right of the lower images) is transparent. The top of this illustration demonstrates the reflections from the transmitter that various multipath components take to the receiver. Note that the second from the right column includes several possible paths. However, the right-most column demonstrates the true path via elimination of candidate paths via the multipath triangulation.

FIG. 6 illustrates an example of multipath triangulation using WLAN signals and three-dimensional (3D) maps generated by depth sensing cameras with no LOS RMC, according to an embodiment. Thus, the situation illustrated in FIG. 6 differs from that illustrated in the top of FIG. 5 only in that the RMC signal is reflected at least once (e.g., no LOS).

Figure 7:
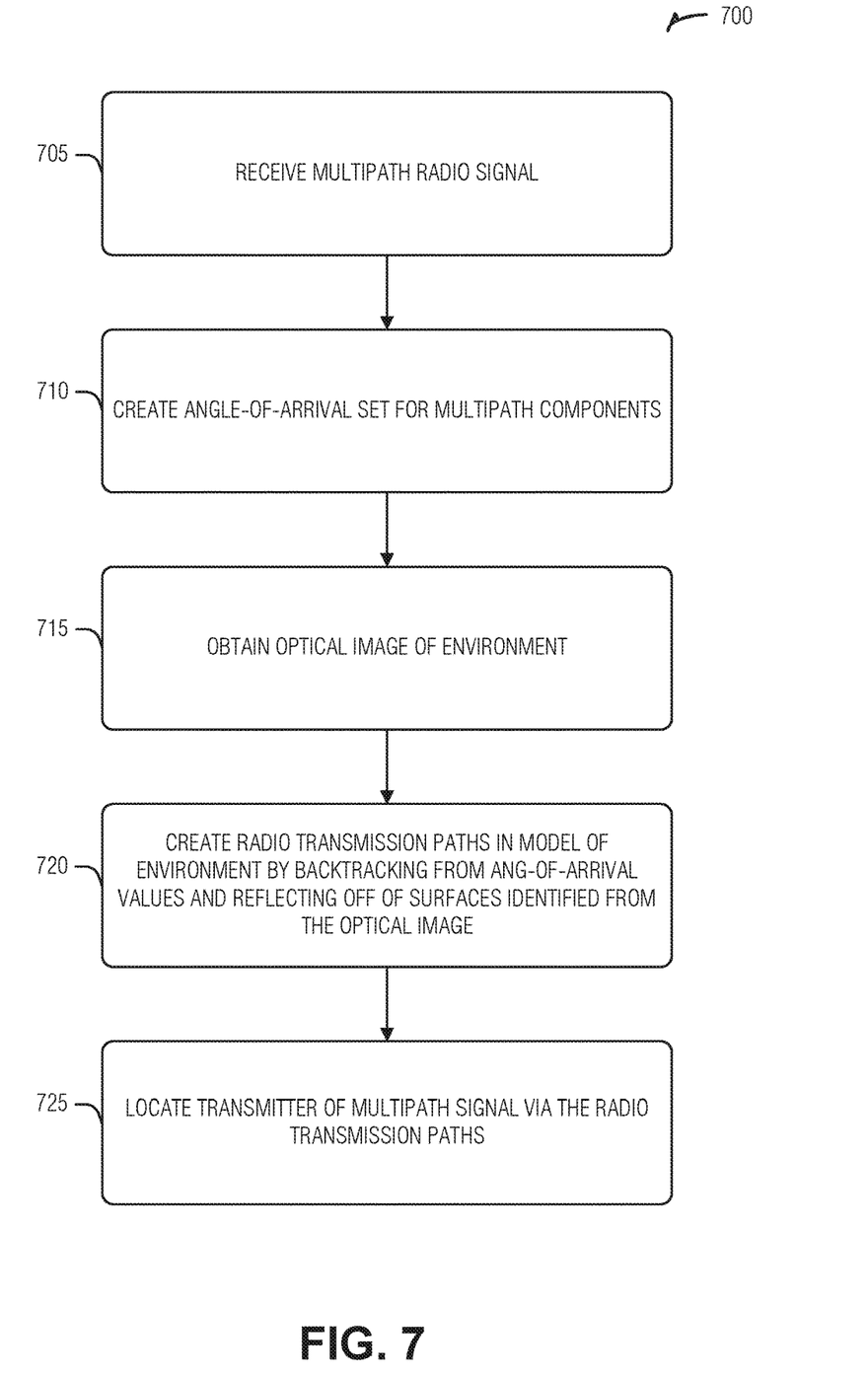
FIG. 7 is an example of a method for locating a radio transmission source by scene reconstruction, according to an embodiment.

FIG. 7 is an example of a method 700 for locating a radio transmission source by scene reconstruction, according to an embodiment. The operations of the method are performed on computer hardware, such as that described above or below (e.g., processing circuitry).

At operation 705, a multipath radio signal comprised of two or more multipath components is received at an antenna array. In an example, the multipath radio signal corresponds to transmission of a packet from a transmitter, such as a station, user equipment, radio frequency ID (RFID) device, etc. In an example, the packet conforms to an IEEE 802.11 family of standards.

At operation 710, a collection of AoA values is created. Here, each AoA in the collection corresponds to a multipath component in the multipath components. In an example, the AoA values are generated from a radio metric of a physical access layer, such as from channel state information (CSI) or the like.

At operation 715, an optical image of an environment is obtained. In an example, the optical image is obtained from a camera housed with the antenna array that received the multipath signal. In an example, the camera is housed separately from the antenna array. In an example, the method 700 is extended to include aligning a field of view (FoV) of the camera with respect to AoA received at the antenna. In an example, the alignment includes positioning the camera and the antenna within a 3D environment. In an example, the alignment includes using multiple cameras at different locations in the environment, the multiple cameras having an overlapping FoV.

At operation 720, a set of paths in a model of the environment is created by backtracking from the antenna array along the AoAs in the collection of AoA values including reflections off of surfaces identified in the optical image. In an example, creating the set of paths in the model includes performing raytracing with a first order reflection model.

In an example, the method 700 is extended to include creating a time-of-flight (ToF) collection for the multipath components. In an example, a multipath component is designated a reference multipath component (RMC) in response to a corresponding ToF being equal to a lowest ToF in the ToF collection. In an example, creating the set of paths (operation 720) includes a requirement that a path corresponding to the RMC has no reflections.

At operation 705, a transmitter of the multipath radio signal is located via the set of paths. In an example, locating the transmitter via the set of paths includes using the set of paths to triangulate the transmitter.

Figure 8:
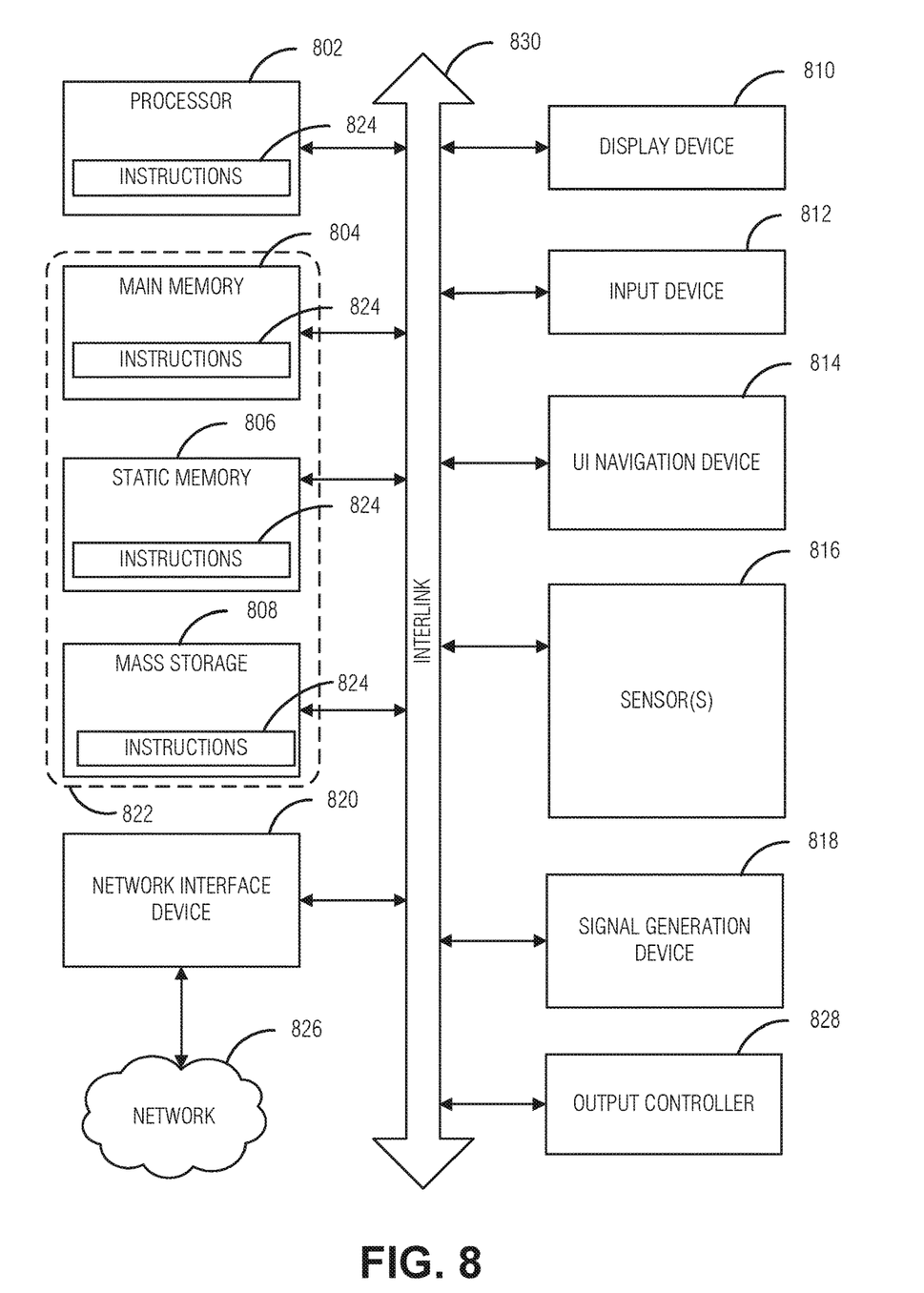
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part, of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UM), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is a device to locate a radio transmission source by scene reconstruction, the device comprising: a radio interface; and processing circuitry to: receive, via the radio interface, a multipath radio signal comprised of two or more multipath components at an antenna array; create a collection of angle-of-arrival (AoA) values, each AoA in the collection corresponding to a multipath component in the multipath components; obtain an optical image of an environment; create a set of paths in a model of the environment by backtracking from the antenna array along the AoAs in the collection of AoA values including reflections off of surfaces identified in the optical image; and locate a transmitter of the multipath radio signal via the set of paths.

In Example 2, the subject matter of Example 1, wherein the multipath radio signal corresponds to transmission of a packet from the transmitter.

In Example 3, the subject matter of Example 2, wherein the packet conforms to an IEEE 802.11 family of standards.

In Example 4, the subject matter of any of Examples 1-3, wherein, to locate the transmitter via the set of paths, the processing circuitry uses the set of paths to triangulate the transmitter.

In Example 5, the subject matter of any of Examples 1-4, wherein, to create the set of paths in the model, the processing circuitry performs raytracing with a first order reflection model.

In Example 6, the subject matter of any of Examples 1-5, wherein the processing circuitry is configured to create a time-of-flight (ToF) collection for the multipath components.

In Example 7, the subject matter of Example 6, wherein a multipath component is designated a reference multipath component (RMC) in response to a corresponding ToF being equal to a lowest ToF in the ToF collection.

In Example 8, the subject matter of Example 7, wherein, to create the set of paths, the processing circuitry requires that a path corresponding to the RMC has no reflections.

Example 9 is a method to locate a radio transmission source by scene reconstruction, the method comprising: receiving a multipath radio signal comprised of two or more multipath components at an antenna array; creating a collection of angle-of-arrival (AoA) values, each AoA in the collection corresponding to a multipath component in the multipath components; obtaining an optical image of an environment; creating a set of paths in a model of the environment by backtracking from the antenna array along the AoAs in the collection of AoA values including reflections off of surfaces identified in the optical image; and locating a transmitter of the multipath radio signal via the set of paths.

In Example 10, the subject matter of Example 9, wherein the multipath radio signal corresponds to transmission of a packet from the transmitter.

In Example 11, the subject matter of Example 10, wherein the packet conforms to an IEEE 802.11 family of standards.

In Example 12, the subject matter of any of Examples 9-11, wherein locating the transmitter via the set of paths includes using the set of paths to triangulate the transmitter.

In Example 13, the subject matter of any of Examples 9-12, wherein creating the set of paths in the model includes performing raytracing with a first order reflection model.

In Example 14, the subject matter of any of Examples 9-13, comprising creating a time-of-flight (ToF) collection for the multipath components.

In Example 15, the subject matter of Example 14, wherein a multipath component is designated a reference multipath component (RMC) in response to a corresponding ToF being equal to a lowest ToF in the ToF collection.

In Example 16, the subject matter of Example 15, wherein creating the set of paths includes a requirement that a path corresponding to the RMC has no reflections.

Example 17 is at least one machine-readable medium including instructions to locate a radio transmission source by scene reconstruction, the instructions, when executed by processing circuitry, cause the processing circuitry to perform operations comprising: receiving a multipath radio signal comprised of two or more multipath components at an antenna array; creating a collection of angle-of-arrival (AoA) values, each AoA in the collection corresponding to a multipath component in the multipath components; obtaining an optical image of an environment; creating a set of paths in a model of the environment by backtracking from the antenna array along the AoAs in the collection of AoA values including reflections off of surfaces identified in the optical image; and locating a transmitter of the multipath radio signal via the set of paths.

In Example 18, the subject matter of Example 17, wherein the multipath radio signal corresponds to transmission of a packet from the transmitter.

In Example 19, the subject matter of Example 18, wherein the packet conforms to an IEEE 802.11 family of standards.

In Example 20, the subject matter of any of Examples 17-19, wherein locating the transmitter via the set of paths includes using the set of paths to triangulate the transmitter.

In Example 21, the subject matter of any of Examples 17-20, wherein creating the set of paths in the model includes performing raytracing with a first order reflection model.

In Example 22, the subject matter of any of Examples 17-21, wherein the operations comprise creating a time-of-flight (ToF) collection for multipath components.

In Example 23, the subject matter of Example 22, wherein a multipath component is designated a reference multipath component (RMC) in response to a corresponding ToF being equal to a lowest ToF in the ToF collection.

In Example 24, the subject matter of Example 23, wherein creating the set of paths includes a requirement that a path corresponding to the RMC has no reflections.

Example 25 is a system to locate a radio transmission source by scene reconstruction, the system comprising: means for receiving a multipath radio signal comprised of two or more multipath components at an antenna array; means for creating a collection of angle-of-arrival (AoA) values, each AoA in the collection corresponding to a multipath component in the multipath components; means for obtaining an optical image of an environment; means for creating a set of paths in a model of the environment by backtracking from the antenna array along the AoAs in the collection of AoA values including reflections off of surfaces identified in the optical image; and means for locating a transmitter of the multipath radio signal via the set of paths.

In Example 26, the subject matter of Example 25, wherein the multipath radio signal corresponds to transmission of a packet from the transmitter.

In Example 27, the subject matter of Example 26, wherein the packet conforms to an IEEE 802.11 family of standards.

In Example 28, the subject matter of any of Examples 25-27, wherein the means for locating the transmitter via the set of paths include means for using the set of paths to triangulate the transmitter.

In Example 29, the subject matter of any of Examples 25-28, wherein the means for creating the set of paths in the model include means for performing raytracing with a first order reflection model.

In Example 30, the subject matter of any of Examples 25-29, comprising means for creating a time-of-flight (ToF) collection for the multipath components.

In Example 31, the subject matter of Example 30, wherein a multipath component is designated a reference multipath component (RMC) in response to a corresponding ToF being equal to a lowest ToF in the ToF collection.

In Example 32, the subject matter of Example 31, wherein the means for creating the set of paths include means for a requirement that a path corresponding to the RMC has no reflections.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device to locate a radio transmission source by scene reconstruction, the device comprising:
   a radio interface; and
   processing circuitry to:
      receive, via the radio interface, a multipath radio signal comprised of two or more multipath components at an antenna array;

create a collection of angle-of-arrival (AoA) values, each AoA in the collection corresponding to a multipath component in the multipath components;
obtain an optical image of an environment;
create a set of paths in a model of the environment by backtracking from the antenna array in a direction that is 180 degrees from each of the AoAs in the collection of AoA values including reflections off of surfaces, using raytracing with a first order reflection model, identified in the optical image, wherein the surfaces from which reflections are traced are selected from all surfaces in the optical image of the environment by selecting a surface from all surfaces in the optical image of the environment by a minimizing a cost function applied to rays traced to all surfaces in the optical image of the environment for an AoA value in the collection of AoA values; and
locate a transmitter of the multipath radio signal from the set of paths using multipath triangulation.

2. The device of claim 1, wherein the multipath radio signal corresponds to transmission of a packet from the transmitter.

3. The device of claim 2, wherein the packet conforms to an IEEE 802.11 family of standards.

4. The device of claim 1, wherein, to locate the transmitter via the set of paths, the processing circuitry triangulates the transmitter from the set of paths.

5. The device of claim 1, wherein the processing circuitry is configured to create a time-of-flight (ToF) collection for the multipath components.

6. The device of claim 5, wherein a multipath component is designated a reference multipath component (RMC) in response to a corresponding ToF being equal to a lowest ToF in the ToF collection.

7. The device of claim 6, wherein, to create the set of paths, the processing circuitry requires that a path corresponding to the RMC has no reflections.

8. A method to locate a radio transmission source by scene reconstruction, the method comprising:
receiving a multipath radio signal comprised of two or more multipath components at an antenna array;
creating a collection of angle-of-arrival (AoA) values, each AoA in the collection corresponding to a multipath component in the multipath components;
obtaining an optical image of an environment;
creating a set of paths in a model of the environment by backtracking from the antenna array in a direction that is 180 degrees from each of the AoAs in the collection of AoA values including reflections off of surfaces, using raytracing with a first order reflection model, identified in the optical image, wherein the surfaces from which reflections are traced are selected from all surfaces in the optical image of the environment by selecting a surface from all surfaces in the optical image of the environment by a minimizing a cost function applied to rays traced to all surfaces in the optical image of the environment for an AoA value in the collection of AoA values; and
locating a transmitter of the multipath radio signal from the set of paths using multipath triangulation.

9. The method of claim 8, wherein the multipath radio signal corresponds to transmission of a packet from the transmitter.

10. The method of claim 9, wherein the packet conforms to an IEEE 802.11 family of standards.

11. The method of claim 8, wherein locating the transmitter via the set of paths includes triangulating the transmitter from the set of paths.

12. The method of claim 8, comprising creating a time-of-flight (ToF) collection for the multipath components.

13. The method of claim 12, wherein a multipath component is designated a reference multipath component (RMC) in response to a corresponding ToF being equal to a lowest ToF in the ToF collection.

14. The method of claim 13, wherein creating the set of paths includes a requirement that a path corresponding to the RMC has no reflections.

15. At least one non-transitory machine-readable medium including instructions to locate a radio transmission source by scene reconstruction, the instructions, when executed by processing circuitry, cause the processing circuitry to perform operations comprising:
receiving a multipath radio signal comprised of two or more multipath components at an antenna array;
creating a collection of angle-of-arrival (AoA) values, each AoA in the collection corresponding to a multipath component in the multipath components;
obtaining an optical image of an environment;
creating a set of paths in a model of the environment by backtracking from the antenna array in a direction that is 180 degrees from each of the AoAs in the collection of AoA values including reflections off of surfaces, using raytracing with a first order reflection model, identified in the optical image, wherein the surfaces from which reflections are traced are selected from all surfaces in the optical image of the environment by selecting a surface from all surfaces in the optical image of the environment by a minimizing a cost function applied to rays traced to all surfaces in the optical image of the environment for an AoA value in the collection of AoA values; and
locating a transmitter of the multipath radio signal from the set of paths using multipath triangulation.

16. The at least one non-transitory machine-readable medium of claim 15, wherein the multipath radio signal corresponds to transmission of a packet from the transmitter.

17. The at least one non-transitory machine-readable medium of claim 16, wherein the packet conforms to an IEEE 802.11 family of standards.

18. The at least one non-transitory machine-readable medium of claim 15, wherein locating the transmitter via the set of paths includes triangulating the transmitter from the set of paths.

19. The at least one non-transitory machine-readable medium of claim 15, wherein the operations comprise creating a time-of-flight (ToF) collection for the multipath components.

20. The at least one non-transitory machine-readable medium of claim 19, wherein a multipath component is designated a reference multipath component (RMC) in response to a corresponding ToF being equal to a lowest ToF in the ToF collection.

21. The at least one non-transitory machine-readable medium of claim 20, wherein creating the set of paths includes a requirement that a path corresponding to the RMC has no reflections.

* * * * *

UNITED STATES PATENT AND TRADEMARK OFFICE
CERTIFICATE OF CORRECTION

PATENT NO. : 10,976,407 B2
APPLICATION NO. : 16/586560
DATED : April 13, 2021
INVENTOR(S) : Perez-Ramirez et al.

Page 1 of 1

It is certified that error appears in the above-identified patent and that said Letters Patent is hereby corrected as shown below:

In the Claims

In Column 13, Line 45, in Claim 8, delete "components:" and insert --components;-- therefor Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*